US012630431B2

(12) United States Patent
Largeteau et al.

(10) Patent No.: US 12,630,431 B2
(45) Date of Patent: May 19, 2026

(54) PROCESS FOR SINTERING HIGH POLYCRYSTALLINE DIAMOND MONOLITHS WITH A HP-SPS-BELT EQUIPMENT

(71) Applicants:Centre National de la Recherche Scientifique, Paris (FR); Université de Bordeaux, Bordeaux (FR); Institut Polytechnique de Bordeaux, Talence (FR)

(72) Inventors: Alain Largeteau, Cestas (FR); Mythili Prakasam, Pessac (FR); Félix Balima, Limerick (IE)

(73) Assignees: CENTRE NATIONAL DE LA RECHERCHE SCIENTIFIQUE, Paris (FR); UNIVERSITÉ DE BORDEAUX, Bordeaux (FR); INSTITUT POLYTECHNIQUE DE BORDEAUX, Talence (FR)

( * ) Notice: Subject to any disclaimer, the term of this patent is extended or adjusted under 35 U.S.C. 154(b) by 495 days.

(21) Appl. No.: 18/253,593

(22) PCT Filed: Nov. 29, 2021

(86) PCT No.: PCT/EP2021/083423
§ 371 (c)(1),
(2) Date: May 18, 2023

(87) PCT Pub. No.: WO2022/117520
PCT Pub. Date: Jun. 9, 2022

(65) Prior Publication Data
US 2024/0002238 A1 Jan. 4, 2024

(30) Foreign Application Priority Data

Dec. 2, 2020 (EP) ..................................... 20306481

(51) Int. Cl.
*C01B 32/28* (2017.01)
*H05H 1/52* (2006.01)

(52) U.S. Cl.
CPC .............. *C01B 32/28* (2017.08); *H05H 1/52* (2013.01); *C01P 2002/72* (2013.01);
(Continued)

(58) Field of Classification Search
None
See application file for complete search history.

(56) References Cited

U.S. PATENT DOCUMENTS

2010/0005729 A1 1/2010 Zhan et al.

FOREIGN PATENT DOCUMENTS

| CN | 103331129 A | 10/2013 |
| WO | 9323204 A1 | 11/1993 |
| WO | 2022117520 A1 | 6/2022 |

OTHER PUBLICATIONS

Foreign Communication from a Related Counterpart Application, European Search Report dated May 26, 2021, European Application No. 20306481.1 filed on Dec. 2, 2020.
(Continued)

*Primary Examiner* — Daniel Berns
(74) *Attorney, Agent, or Firm* — Chrisman Gallo Tochtrop LLC

(57) ABSTRACT
The present invention relates to highly pure high performance polycrystalline diamond monolith, a method for manufacturing a single-crystal diamond, and uses thereof.

13 Claims, 4 Drawing Sheets

(52) U.S. Cl.
CPC ...... *C01P 2002/82* (2013.01); *C01P 2004/03*
(2013.01); *C01P 2004/53* (2013.01); *C01P*
*2004/61* (2013.01); *C01P 2004/62* (2013.01);
*C01P 2004/64* (2013.01); *C01P 2006/80*
(2013.01)

(56) References Cited

OTHER PUBLICATIONS

Foreign Communication from a Related Counterpart Application, International Search Report and Written Opinion dated Feb. 9, 2022, International Application No. PCT/EP2021/083423 filed on Nov. 29, 2021.

H. Sumiya, "Novel Development of High-Pressure Synthetic Diamonds "Ultra-hard Nano-polycrystalline Diamonds"", SEI Technical Review, No. 74, Apr. 2012, 9 pages.

H. Sumiya, et al., "Super-hard diamond indenter prepared from high-purity synthetic diamond crystal," Review of Scientific Instruments 76, 026112, 2005, 3 pages.

Polymer gasket

Raw pyrophyllite gasket

Steel cover filled with
fired pyrophyllite pellet

Mo discs sandwiching mica ring

Graphite heater

Fired pyrophyllite tube

HP cell assembly

PROCESS FOR SINTERING HIGH POLYCRYSTALLINE DIAMOND MONOLITHS WITH A HP-SPS-BELT EQUIPMENT

CROSS-REFERENCE TO RELATED APPLICATIONS

The present application is a filing under 35 U.S.C. 371 as the National Stage of International Application No. PCT/EP2021/083423, filed Nov. 29, 2021, entitled "PROCESS FOR SINTERING HIGH PERFORMANCE POLYCRYSTALLINE DIAMOND MONOLITHS WITH A HP-SPS-BELT EQUIPMENT," which claims priority to European Application No. 20306481.1 filed with the European Patent Office on Dec. 2, 2020, both of which are incorporated herein by reference in their entirety for all purposes.

FIELD OF THE INVENTION

The present invention relates to highly pure high performance polycrystalline diamond monolith.

BACKGROUND OF THE INVENTION

Diamond is the hardest substance known in nature. It is the allotrope of carbon which, when pure, exhibits the following properties:

Hardness: 10 on the mohs scale (10=hardest); electrical resistance: $10^{18}$ $\Omega \cdot$m; thermal conductivity: ~2500 W·m/m$^2$ (Cu=385 W·m/m$^2$); refractive index: 2.417; dielectric constant/strength: 5.6, $10^7$ V/cm; band gap: 5.45 eV; mobility: 1,600 cm$^2$/Ns; oxidation temperatures: air:=~1000° C., O2=~600° C.; graphite transformation temperature (vacuum, inert atmosphere): ~1,500° C.; widest known transmission spectrum: 220 nm to >50 µm—x-ray, infrared, terahertz and microwave; highly chemical inert; lowest coefficient of thermal expansion: 1.1-1.3 (Invar=1.4).

Diamonds have excellent characteristics such as high light transmissivity, high thermal conductivity, high carrier mobility, high dielectric breakdown electric field and low inductive loss, and are widely used for cutting tools and abrasion-proof tools particularly because of its unusually high hardness. Diamonds have excellent performance in terms of wear resistance, compressive strength, heat dissipation rate, and sound transmission rate. In addition to its highly desirable physical properties, diamond is a beautifully lustrous transparent crystal making it the "King" of gemstones.

Diamond is widely used in industrial and military fields. However, the current total output of natural diamonds in the world is limited and expensive, which seriously affects the expansion of the application field of natural diamond tools. Although large-scale synthetic diamond single crystals have been produced on a large scale, their growth rate is slow, the synthesis time is long, and the manufacturing cost is high. In the field of ultra-fine cutting processing, they cannot completely replace natural diamond tool materials.

The two most common diamond fabrication methods include HP-HT (high pressure-high temperature) and CVD (chemical vapor deposition).

HP-HT emulates the natural process of diamond formation deep within the earth's crust wherein elemental carbon is subjected to high temperatures, ~2000° C., and high pressures, ~1.5 million psi. Under these conditions, the industrial process is based on the phase transformation of carbon into diamond takes place by dissolution and precipitation in molten metal such as nickel (lower pressure range) or by solid phase transformation of carbon into diamond (higher pressure range). Product cycles range from about 3 weeks to 2 months regarding the size of diamond particles to synthetize and few minutes for nano/micro-sized particles.

HP-HT process is also typically used with diamond powder with the use of a binder or sintering aid to induce the formation of ceramics constituted of diamond particles inside a matrix of metal (usually Co), which allows to carry out the process at lower pressure (~6 GPa). The conventional synthetic diamond polycrystalline diamond (referred to as PCD) sintered body is a composite superhard material that is made by uniformly mixing synthetic diamond powder and Co, Ni and other metal powders and sintering under high pressure and high temperature. With higher hardness and toughness, the application performance is better than single crystal in some aspects, and it has been widely used in automobile manufacturing, furniture manufacturing, aerospace and other fields. However, the binder contained in traditional synthetic polycrystalline diamond materials, such as Co, Ni, etc., seriously affects the hardness, wear resistance and thermal stability of the artificial diamond polycrystalline sintered material.

HP-HT Diamond preparation from graphite powder without binder to eliminate the effect of the binder, has been attempted, but the method requires ultra high pressures (15-20 GPa) and very high temperatures (2000-2500° C.). [Ref 1] More recently, HP-HT diamond preparation from diamond powder without binder has been attempted, but the method still requires relatively high pressures (8-20 GPa) and rather high temperatures (1400-2500° C.). [Ref 2]

CVD diamond fabrication processes grow diamond by energetic decomposition of a carbon source gas such as methane inside a large sealed chamber filled by the gas, having a diamond forming surface heated to ~800° C. bearing diamond particulates which function as the seed about which carbon atoms assemble to form diamond. Product cycles range from 2 weeks to 2 months. CVD processes produce more diamond per cycle than do HP-HT processes, but there are higher labor, power, and support costs for CVD processes than for HP-HT processes.

Therefore, there remains a need for methods of diamond fabrication which can provide high purity diamond products reliably, economically, and readily. The present invention fulfills this need and provides further related advantages.

Figure 1:
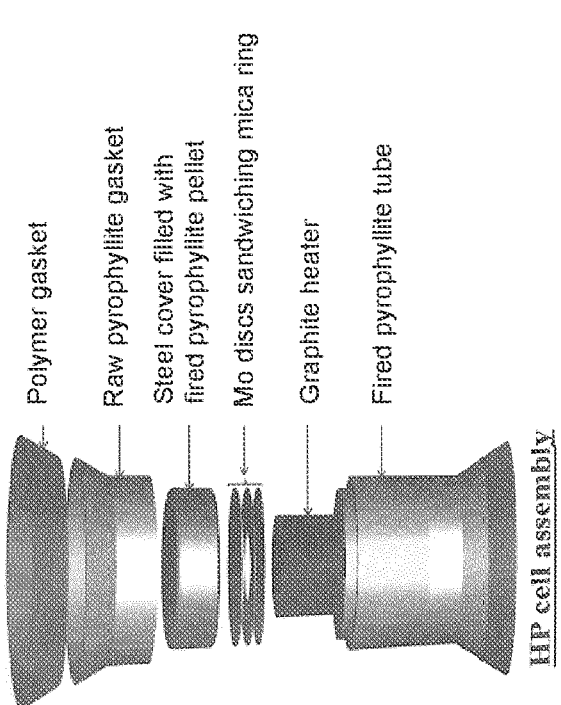
FIG. 1 schematically shows an exemplary HP cell assembly of a HP-HT tool belt type apparatus used in the context of the present invention. The sample sandwiched between two graphite studs (similar to conventional SPS mold assembly) inside the graphite heater tube and both studs are not represented.
Figure 2:
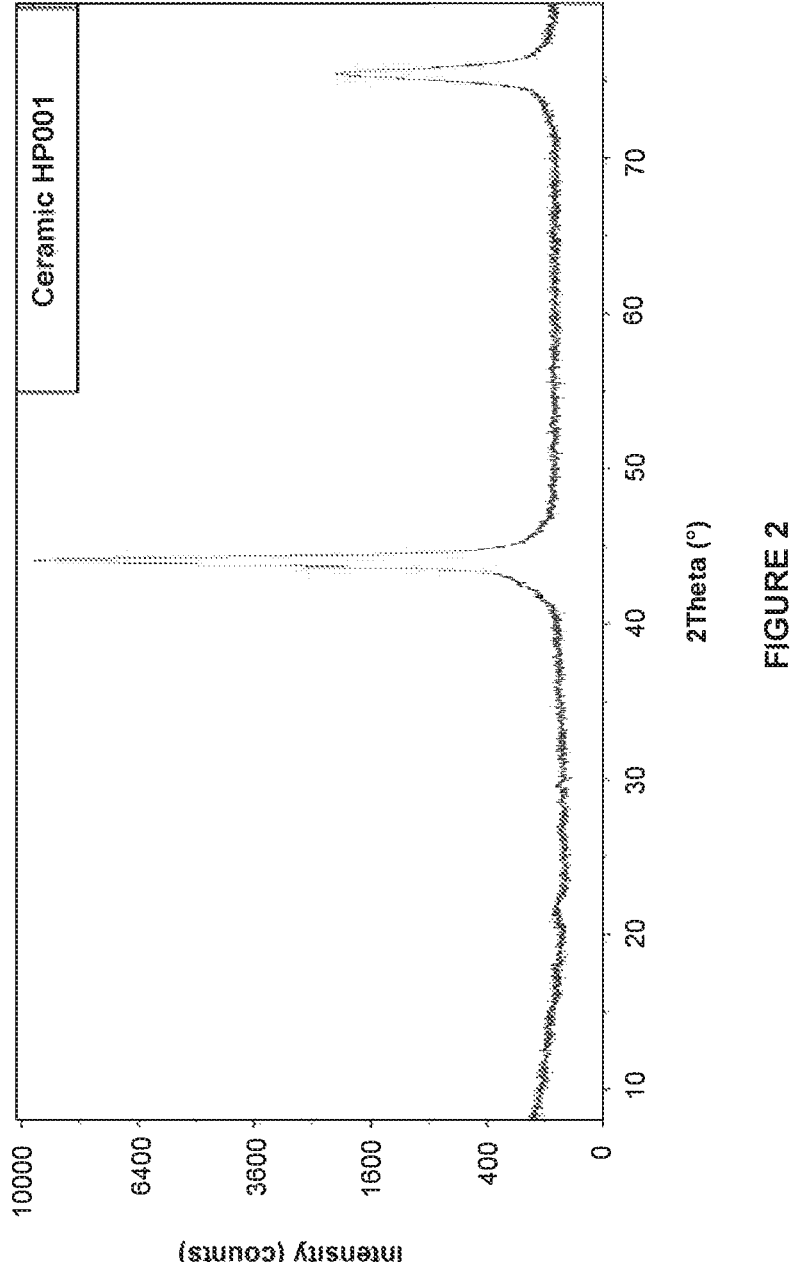
FIG. 2 shows an XRD diffractogram of a diamond monolith obtained according to the present disclosure (Table 1, HP001), showing no impurities like binder, sintering aids, etc. in a pure diamond monolith obtained after sintering micrometric diamond powder according to the process of the present invention.

While the system and process of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

Definitions

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

To facilitate an understanding of the present invention, a number of terms and phrases are defined below:

As used herein other than the claims, the terms "a," "an," "the," and/or "said" means one or more. As used herein in the claim(s), when used in conjunction with the words "comprise," "comprises" and/or "comprising," the words "a," "an," "the," and/or "said" may mean one or more than one. As used herein and in the claims, the terms "having," "has," "is," "have," "including," "includes," and/or "include" has the same meaning as "comprising," "comprises," and "comprise." As used herein and in the claims "another" may mean at least a second or more. As used herein and in the claims, "about" refers to any inherent measurement error or a rounding of digits for a value (e.g., a measured value, calculated value such as a ratio), and thus the term "about" may be used with any value and/or range.

The phrase "a combination thereof" "a mixture thereof" and such like following a listing, the use of "and/or" as part of a listing, a listing in a table, the use of "etc." as part of a listing, the phrase "such as," and/or a listing within brackets with "e.g.," or i.e., refers to any combination (e.g., any sub-set) of a set of listed components, and combinations and/or mixtures of related species and/or embodiments described herein though not directly placed in such a listing are also contemplated. Such related and/or like genera(s), sub-genera(s), specie(s), and/or embodiment(s) described herein are contemplated both in the form of an individual component that may be claimed, as well as a mixture and/or a combination that may be described in the claims as "at least one selected from," "a mixture thereof" and/or "a combination thereof."

As used herein, the term "and/or" means any one of the items, any combination of the items, or all of the items with which this term is associated.

As will be understood by the skilled artisan, all numbers, including those expressing quantities of ingredients, properties such as particle size, pressure and temperature, experimental conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As used herein, the term "about" can refer to a variation of ±5% of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., particle size values, proximate to the recited range that are equivalent in terms of the functionality of the individual ingredient, the composition, or the embodiment.

As will be understood by one skilled in the art, for any and all purposes, particularly in terms of providing a written description, all ranges recited herein also encompass any and all possible subranges and combinations of subranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

DETAILED DESCRIPTION OF CERTAIN PREFERRED EMBODIMENTS OF THE INVENTION

Illustrative embodiments are described below. In the interest of clarity, not all features of an actual implementation are described in this specification. It will of course be appreciated that in the development of any such actual embodiment, implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and process will be understood, both as to its structure and operation, from the accompanying drawings, taken in conjunction with the accompanying description. Several embodiments of the system are presented herein within FIGS. 1-4. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

In one aspect, the invention provides a method for preparing a highly pure high performance polycrystalline diamond monolith, the method comprising a sintering step by high pressure spark plasma sintering (HP-SPS), a diamond powder at 1400-1600° C. under a pressure of 3-5 GPa, preferably 4-5 GPa, more preferably 5 GPa, in the absence of binder, graphitic material precursor and sintering aid/catalyst aimed at catalysing the formation of intergranular bonds between diamond grains during the sintering step, wherein the size of the diamond powder particles ranges from 10 nm to 100 μm.

Spark plasma sintering (SPS), sometimes referred to as a field-assisted sintering technique (FAST), is a consolidation method that uses pulsed electric current for heating and low pressure assistance. SPS is an attractive consolidation technique due to, fast heating rate, and brief consolidation cycles (on the order of minutes). The interest of using electric current in SPS lies in that an intense electric current is allowed to flow directly through the sample that is intended to be sintered. The main characteristic of SPS is that the sequence of pulsed (on) or unpulsed (off) DC or AC current directly passes through the SPS sample cell, as well as the powder compact, in case of conductive samples.

According to the present invention, pulsed direct current may be used.

According to the present invention, any HP-SPS apparatus may be used. For example, a HP-SPS-Belt or HP-SPS-Bridgmann may be used. Preference is given to HP-SPS-Belt apparatus. For example, a HP-HT conventional tool belt type apparatus may be used, in combination with a pulsed electric current generator (HP-HT tool belt type apparatus activated by pulsed electric current (HP-SPS-Belt)).

Advantageously, the spark plasma sintering effect may be effected by the application of a pulsed electric current. The pulsed electric current may be generated with a pulse duration from 1 to 5 ms, for example from 1 to 4 ms, for example from 2 to 4 ms, for example from 3 to 4 ms. Pulse duration of 3.0 ms, 3.1 ms, 3.2 ms, 3.3 ms, 3.4 ms, 3.5 ms, 3.6 ms, 3.7 ms, 3.8 ms, 3.9 ms or 4.0 ms may be used. For example, the pulsed electric current may be generated with a pulse duration of 3.3 ms. The pulsed electric current may be produced by any suitable pulsed electric generator (which may be identical to the pulsed electric generator used in conventional SPS). The pulse duration will depend from the pulsed electric generator used. For example a Thyristor pulsed electric generator may produce pulsed electric current with a pulse duration of 3.3 ms.

As the reader will readily appreciate, the power needed from the generator will be defined by: the temperature to be reached, the heating element material & geometry used (for example a graphite tube may be used in advantageous variants of the present disclosure; e.g., in a HP-SPS-Belt apparatus according to the present disclosure) and size of the cell/pressure vessel to be heated (for example a Belt cylinder when a HP-SPS-Belt apparatus is used). For example, when a HP-SPS-Belt apparatus such as that described in the Examples is used, the pulsed electric current may be generated by an electric pulse generator capable to deliver 30000 W (e.g., 3000 A/10V). For example, it may be delivered from a direct pulsed electric current (for example from a Thyristor pulsed electric current generator).

The pulse sequence (on:off) may be 1-99:1-9 meaning that the pulse may be "on" for 1-99 times a given pulse duration (as defined in several variants above), and then "off" for 1 to 9 times the pulse duration. For example, the pulse sequence (on:off) may be 10-14:1-3, for example 11-13:1-3 (stated differently, the pulse may be "on" for 10 to 14 times a given pulse duration, for example 11 to 13 times a given pulse duration (as defined in several variants above), and then "off" for 1 to 3 times the pulse duration). Advantageously, the pulse sequence (on:off) may be 12:2. Advantageously, the pulse sequence (on:off) may be 12:2 and may be delivered from a direct pulse current. Advantageously, the pulse sequence (on:off) as defined above may be combined with any one of the pulse durations as defined in several variants above. Advantageously, the pulse sequence (on:off) may be 12:2 and the pulse duration 3.3 ms (the pulse is "on" for 12×3.3 ms, and then "off" for 2×3.3 ms).

According to the present invention, a highly pure high performance polycrystalline diamond monolith, can be synthesized from nano-sized or micro-sized diamond powders using SPS under a high pressure (e.g., 3-5 GPa, preferably 4-5 GPa, more preferably 5 GPa). A stark advantage of the method of the invention over existing sintering processes for preparing diamond monoliths is that the process does not use any additives such as binder, graphitic material precursor or sintering aid/catalyst aimed at catalysing the formation of intergranular bonds between diamond grains during the sintering step. As such, the method of the invention leads to highly pure diamond monoliths. Another advantage over existing methods resides in the application of lower pressures and temperatures.

As used herein "highly pure", when qualifying polycrystalline diamond monoliths ("PCD monoliths"), refers to PCD monoliths containing >98% diamond, preferably >99% diamond, more preferably >99.5% diamond, most preferably >99.9% diamond.

Advantageously, no graphitic carbon and no additives are detected in the high performance polycrystalline diamond monolith obtained by the process of the invention.

Advantageously, the polycrystalline diamond monolith obtained from the method of the present invention is chemically pure as measured by XRD.

Advantageously, the polycrystalline diamond monolith obtained from the method of the present invention is free of graphite phase as measured by Raman spectroscopy.

Advantageously, the polycrystalline diamond monolith obtained from the method of the present invention presents only diamond phase as measured by Raman spectroscopy.

Most advantageously, the polycrystalline diamond monolith obtained from the method of the present invention has all three features above: is chemically pure as measured by XRD, is free of graphite phase as measured by Raman spectroscopy, and presents only diamond phase as measured by Raman spectroscopy.

According to the present disclosure, the diamond powder used in the method may be raw diamond powder material obtained by any method known in the art or from natural minerals. For example, the diamond powder may be obtained from static high pressure method, mechanical crushing large diamond particles, chemical vapor deposition, or from natural minerals, residues from the mining of diamond mines or the cutting of diamonds.

According to the present disclosure, the diamond powder used in the method may be a nanometric diamond powder with a particle size ranging from 10-900 nm, preferably 10-500 nm, more preferably 10-300 nm, most preferably 70-130 nm.

According to the present disclosure, the diamond powder used in the method may be a micrometric diamond powder with a particle size ranging from 1-100 μm, preferably 1-50 μm, more preferably 1-10 μm, more preferably 6-10 μm, most preferably 3-6 μm.

As used herein, the term "nanometric diamond" is understood to refer to diamond powder whose particle size (min-max value) is a few nanometers in at least one of the spatial dimensions. For example, the min-max value of the particle size of the diamond powder in at least one of the spatial dimensions is between 10-900 nm, preferably 10-500 nm, more preferably 10-300 nm, most preferably 70-130 nm.

As used herein, the term "micrometric diamond" is understood to refer to diamond powder whose particle size (min-max value) is between 1-100 μm, preferably 1-50 μm, more preferably 1-10 μm, more preferably 6-10 μm, most preferably 3-6 μm.

The diamond powder may comprise diamond particles of micrometric dimension only, or nanometric dimension only, or a mixture of micrometric and nanometric diamond particles.

According to the present disclosure, the diamond powder used in the method may be a heterogenous mixture of nanometric and micrometric diamond powder with a min-max value of particle size ranging from 10 nm to 100 μm.

The diamond particle size may be measured by dynamic light scattering (DLS).

Dynamic Light Scattering (DLS) measurements may be performed on suspended nanometric diamond and/or micrometric diamond samples. Suspensions of nanometric diamond and/or micrometric diamond may be prepared at a concentration of 1 g/L and may be submitted to one hour of ultrasonic stirring and ultracentrifugation. The particle size of the nanometric diamond and/or micrometric diamond present in the supernatant of the resulting suspensions may be analyzed by Dynamic Light Scattering (for example using a Malvern zetasizer NanoZS). Particle-size may be obtained by a careful statistical evaluation of the size of more than 500 individual particles for each sample (the dimensions of nanometric diamond and/or micrometric diamonds can be measured by 4 different persons, to ensure the reproducibility of the results). When diamond particles (nanometric and/or micrometric) are asymmetrical, the particle size may be measured with reference of the size of the dimension of the major axis of the diamond particle.

According to the present disclosure, the raw diamond powder may be placed inside an HP-SPS electrically conducting cell, as is, or in the form of a pre-packed molded body, such as an HP-SPS-Belt electrically conducting cell. Typically, the raw diamond powder sample may be sandwiched between two graphite studs inside a graphite tube (which explains the electrically conducting character of the HP-SPS cell). Accordingly, throughout the present disclosure, when referring to "an HP-SPS electrically conducting cell" or "an HP-SPS-Belt electrically conducting cell, it will be understood that the HP-SPS cell or HP-SPS-Belt cell is specially configured to be electrically conductive, such as a cell assembly where the sample is sandwiched between two graphite studs inside a graphite tube. If placed inside an HP-SPS electrically conducting cell, as is, the diamond power may be first subjected to the desired pressure (to pre-compact the powder into a molded body), and then the temperature increase may be executed. Once in the HP-SPS electrically conducting cell, such as an HP-SPS-Belt electrically conducting cell, the raw diamond powder, preferably pre-compacted into a molded body as described above, may be sintered for 5 seconds to 30 minutes, preferably 10 seconds to 30 minutes, preferably 30 seconds to 30 minutes, preferably 1-30 minutes, preferably 1-20 minutes, more preferably 1-10 minutes, at 1400-1600° C. under a pressure of 4-5 GPa, preferably 5 GPa.

According to the present disclosure, the raw diamond powder may be shaped into a body without binder prior to being placed inside the HP-SPS electrically conducting cell, such as an HP-SPS-Belt electrically conducting cell, or prior to being sintered in the HP-SPS electrically conducting cell.

According to the present disclosure, the method may further include manufacturing a molded body by preliminarily preparing pre-packing the raw diamond powder, and the molded body may be spark-plasma-sintered to manufacture the highly pure high performance polycrystalline diamond monolith. In the case of formation of the molded body, any method may be used without limitation as long as the method is a conventional method of forming a molded body using powder, and a representative example thereof may include a method of manufacturing a pre-molded body by supplying a complex powder to a mold.

For example, the pre-molded body may be manufactured by charging the raw diamond powder into in a graphite tube (heating element) contained in the HP-SPS electrically conducting cell, the raw diamond powder being sandwiched between two graphite studs inside the graphite tube to ensure electrical conductivity of the HP-SPS cell. Unlike in the conventional SPS technique where the sample to be sintered is contained in a graphite mold (which is the heating element) placed in a vacuum chamber, according to a preferred variant of the present invention, the sample (raw diamond powder) sandwiched between two graphite studs may be placed in the graphite tube (heating element), contained in the HP-SPS electrically conducting cell, placed in the Belt cylinder (typically made of tungsten carbide to withstand the high pressure) which is not under vacuum because the HP-SPS cell completely fills the Belt cylinder (pressure vessel).

The diamond powder is preferably pre-compacted in the HP-SPS electrically conducting cell to try to reduce the lost volume due to the void between the diamond particles. The molded body can be compared to the "green body" in ceramics that is usually removed from its mold, which is not done in the case of the diamond powder pre-molded body used according to the present disclosure. The particularity of diamond particles is that they do not agglomerate. Nevertheless, through the present invention, it is possible to give a shape to a sample of diamond particles if there is sintering of these diamond particles to allow the holding of the diamond particles together (intergranular cohesion=intergranular bonds) even without binder.

Without wishing to be bound be any particular theory, it is believed that during spark-plasma-sintering process, a spark phenomenon is caused using a pulsed electric direct current flowing among the particles of the raw diamond powder by applying the sequence of on:off pulse electric current to the diamond powder in the state in which pressure is applied thereto. Thereby, the diamond powder is sintered due to thermal diffusion and electrotransport caused by the high energy of the spark plasma during the sequence of on pulse time (for example, on=12=>12×3.3 ms) that is instantaneously generated, combined with the heat generated by the electric resistance of the graphite tube heater assembly (two graphite studs sandwiching the diamond powder sample inside a graphite tube) inside the HP-SPS-Belt cell (FIG. 1, graphite studs and diamond powder not represented), under the applied pressure by electric energy.

Accordingly, the sintering of the nanometric and/or micrometric diamond powder may be performed in a short period of time to thus manufacture a highly pure high performance polycrystalline diamond monolith having a dense structure. Such sintering ability makes it possible to effectively control the growth of the crystal grains of the polycrystalline diamond monolith and to manufacture a polycrystalline diamond monolith which is highly pure and with high performance.

Temperature Increase Rate

The diamond powder, preferably pre-compacted into a molded body, may be brought to the desired sintering temperature by increasing the temperature at a constant heating rate to allow the temperature to be uniformly supplied to the inside and the outside of the diamond powder through the HP-SPS process. For example any constant heating rate from 100° C./min to 500° C./min may be used. For example at a constant temperature increase rate of 100° C./min, 150° C./min, 200° C./min, 250° C./min, 300° C./min, 350° C./min, 400° C./min, 450° C./min or 500° C./min may be used.

Sintering Time and Temperature

The HP-SPS process may be preferably performed at a temperature of at 1400-1600° C., for example 1500-1600° C. For example, the temperature may be maintained for 5 seconds to 30 minutes, preferably 10 seconds to 30 minutes, preferably 30 seconds to 30 minutes, preferably 1-30 minutes, preferably 1-20 minutes, more preferably 1-10 minutes. Although lower and higher temperatures may be used, preference may be given to the range of 1400-1600° C., for example 1500-1600° C., because it is believed to confer advantageous benefits. Specifically, when the temperature of the HP-SPS process is higher than 1600° C., the crystal grains of the diamond monolith may grow rapidly, thus potentially deteriorating the mechanical properties thereof. Further, when the HP-SPS process is performed for less than 5 seconds, it may be difficult to expect a sufficient sintering effect due to incomplete sintering. On the other hand, when the sintering time exceeds 30 minutes, energy consumption is increased, thus reducing economic efficiency, and it may be difficult to expect the densification effect caused by the sintering.

Sintering Pressure

Moreover, the HP-SPS process may be performed under a pressure of 3-5 GPa, preferably 4-5 GPa, more preferably 5 GPa so as to pressurize the diamond powder, thus manufacturing the highly pure high performance polycrystalline diamond monolith. When the pressure is less than 3 GPa, there is a drawback in that the density of the polycrystalline diamond material is lowered. When the pressure is more than 5 GPa, there is a higher risk that cracks may form in the polycrystalline diamond due to high pressure, thereby negatively impacting mechanical properties. One advantage of the present invention is that the HP-SPS system (i.e., equipment) allows to reach high pressures such as 3-5 GPa, preferably 4-5 GPa, more preferably 5 GPa because there is a Belt system which is combined with a pulsed electric generator (which may be identical to the pulsed electric generator used in conventional SPS).

Compression Time

The diamond powder may be brought to the desired sintering pressure by increasing the pressure at a constant compression rate to allow the pressure to be uniformly supplied through the diamond powder. This may incidentally have the effect of pre-compacting the raw diamond powder into a molded body. For example, the pressure may be increased from atmospheric pressure (101325 Pa) to the target sintering pressure (i.e., 3-5 GPa, preferably 4-5 GPa, more preferably 5 GPa) over 0.5 to 5 hours, for example 0.5 to 4 hours, for example 0.5 to 3 hours.

Decompression Time

After sintering, the sample may be may be brought to atmospheric pressure (101325 Pa) by decreasing the pressure at a constant decompression rate. For example, after sintering, the pressure may be decreased from the target sintering pressure (e.g., 3-5 GPa, preferably 4-5 GPa, more preferably 5 GPa) back to atmospheric pressure over 0.5 to 5 hours, for example 0.5 to 4 hours, for example 0.5 to 3 hours.

Temperature Decrease Rate

After sintering, the sample may be brought back to room temperature by decreasing the temperature at a constant cooling rate. For example any constant cooling rate from −100° C./min to −500° C./min may be used. For example at a constant temperature decrease rate of −100° C./min, −150° C./min, −200° C./min, −250° C./min, −300° C./min, −350° C./min, −400° C./min, −450° C./min or −500° C./min may be used.

Advantageously:

(i) the diamond powder may be brought to the target pressure (e.g., 3-5 GPa, preferably 4-5 GPa, more preferably 5 GPa), without heating, by following a constant compression rate, as defined above;

(ii) then the sample may be heated to the target sintering temperature (e.g., 1400-1600° C., for example 1500-1600° C.), by following a constant heating rate, as defined above;

(iii) then the sample may be maintained at the sintering temperature for the desired sintering duration (e.g., for 5 seconds to 30 minutes, preferably 10 seconds to 30 minutes, preferably 30 seconds to 30 minutes, preferably 1-30 minutes, preferably 1-20 minutes, more preferably 1-10 minutes);

(iv) then the sample may be cooled down to room temperature by following a constant heating rate, as defined above; and (v) finally the sample may be brought to atmospheric pressure by following a constant decompression rate, as defined above.

More preferably, the HP-SPS process may be performed at a sintering temperature of 1400-1600° C., for example 1500-1600° C., for 5 seconds to 30 minutes, preferably 10 seconds to 30 minutes, preferably 30 seconds to 30 minutes, preferably 1-30 minutes, preferably 1-20 minutes, more preferably 1-10 minutes, under a pressure of 3-5 GPa, preferably 4-5 GPa, more preferably 5 GPa, in the absence of any additives such as binder, graphitic material precursor and sintering aid/catalyst aimed at catalysing the formation of intergranular bonds between diamond grains during the sintering step, to thus manufacture a complex material of metal and single-walled carbon nanotubes having excellent mechanical properties.

For example, the method may be carried out:

using only nanometric diamond powder, by sintering at 5 GPa at a temperature at least 1400-1500° C., preferably at least 1500° C., for 5 seconds to 30 minutes, preferably 10 seconds to 30 minutes, preferably 30 seconds to 30 minutes, preferably 1-30 minutes, preferably 1-20 minutes, more preferably 1-10 minutes;

using only micrometric diamond powder, by sintering at 5 GPa at a temperature at least 1500° C. for 5 seconds to 30 minutes, preferably 10 seconds to 30 minutes, preferably 30 seconds to 30 minutes, preferably 1-30 minutes, preferably 1-20 minutes, more preferably 1-10 minutes;

using a mixture of nanometric and micrometric diamond powder, by sintering at 5 GPa at a temperature at least 1600° C. for 5 seconds to 30 minutes, preferably seconds to 30 minutes, preferably 30 seconds to 30 minutes, preferably 1-30 minutes, preferably 1-20 minutes, more preferably 1-10 minutes.

Several process parameters have been described herein for reducing to practice the method according to the present disclosure: sintering pressure, sintering temperature, sintering time, electric pulse on:off sequence, electric pulse duration, temperature increase rate, temperature decrease rate, compression time, and decompression time. Exemplary value ranges for each parameters have been provided herein. It is understood that the method according to the present disclosure may be carried out by using any one value range, or any one specific value, described herein for each and every above-mentioned parameters.

As shown in the Examples, the method of the present disclosure makes it possible to preserve the stability of diamond during such sintering conditions.

As discussed previously, the method according to the present disclosure allows to prepare polycrystalline diamond monolith having at least one, if not three features: is chemically pure as measured by XRD, is free of graphite phase as measured by Raman spectroscopy, and only has diamond phase as measured by Raman spectroscopy; thereby ensuring excellent mechanical properties and transparency in the IR and visible in the case of zero porosity.

Mechanical Properties

Advantageously, the resulting polycrystalline diamond monolith may exhibit sufficient mechanical strength for handling the polycrystalline diamond monolith without disaggregation. In other words, the method leads to a non-friable monolith (a flowing powder is obtained when no heating is applied at 5 GPa).

Conventional polycrystalline diamonds («PCDs») used in commercially available cutting tools and wear-resisting tools represent sintered compacts of diamond powders using sintering aids or binder materials such as Co. The PCDs contain the additives in the grain boundaries, which decrease mechanical properties and thermal stability, while significantly undermining the performance of tools.

Polycrystalline diamond monoliths obtained according to the method of the present disclosure are binder-free. They are also made in the absence of any graphitic material precursor and sintering aid/catalyst aimed at catalysing the formation of intergranular bonds between diamond grains during the sintering step. For that reason, polycrystalline diamond monoliths obtained according to the method of the present disclosure exhibit a hardness, a strength and abrasive wear resistance superior to that of conventional PCDs prepared using a binder. Polycrystalline diamonds, free from such sintering aids and binders, are considered to be ideal hard materials, with hardness, strength, and thermal stability that are all well balanced.

For example, polycrystalline diamond monoliths obtained according to the method of the present disclosure may exhibit a hardness $\geq 70$ GPa, preferably $\geq 80$ GPa, preferably $\geq 90$ GPa, preferably $\geq 100$ GPa, as measured at room temperature (25° C.±5° C.) using high-hardness Knoop indenters made from synthetic type IIa SCD characterized by highhardness orientations, as taught by H. Sumiya et al., "Super-hard diamond indenter prepared from high-purity synthetic diamond crystal," Rev. Sci. Instrum., 76, 026112 (2005) [Ref 3].

Strength measurements may be carried out using the transverse rupture strength (TRS) method at room temperature (25° C.±5° C.). The TRSs of polycrystalline diamond monoliths obtained according to the method of the present disclosure can be measured with a jig made from SiC (span length: 4 mm). For example, polycrystalline diamond monoliths obtained according to the method of the present disclosure may exhibit a TRS at room temperature $\geq 2.5$ GPa, preferably $\geq 3.0$ GPa, which is higher than the TRS of other ceramic materials and conventional binder-containing PCDs.

Abrasive wear properties of polycrystalline diamond monoliths obtained according to the method of the present disclosure can be evaluated in grinding experiments using a metal-bonded diamond grinding wheel. For example, the abrasive wear resistance may be evaluated by measuring the wear rate with an applied load: 3 kg/mm$^2$, sample 1.0.×1.0 mm, with a diamond wheel (metal bonded, #800), 2800 rpm. Polycrystalline diamond monoliths obtained according to the method of the present disclosure may exhibit a wear rate $\geq 20$ $\mu$m/min, preferably $\geq 30$ $\mu$m/min, preferably $\geq 40$ $\mu$m/min, preferably $\geq 50$ $\mu$m/min, preferably $\geq 60$ $\mu$m/min, preferably $\geq 70$ $\mu$m/min, preferably $\geq 80$ $\mu$m/min, preferably $\geq 90$ $\mu$m/min, preferably $\geq 100$ $\mu$m/min, which is higher than the wear rate of other ceramic materials and conventional binder-containing PCDs in the same experimental conditions.

Optical Properties

Advantageously, the dense resulting polycrystalline diamond monolith may be transparent in the infrared region such that it allows the transmission of 85% of incident light at wavelengths 700 nm-0.1 mm.

Advantageously, the resulting polycrystalline diamond monolith may be at least translucent, preferably transparent in the visible region such that it allows the transmission of 85% of incident light at wavelengths 380 nm to 700 nm (polycrystalline diamond monolith with no physical defects, no chemical impurities, and 100% dense).

Applications

These characteristics of polycrystalline diamond monoliths obtained according to the method of the present disclosure suggest their outstanding potential as a hard material suited for cutting tools and wear-resistant tools such as dressers, scribers, styli, dies, and nozzles. Due to its translucency/transparency in the IR and the visible range, polycrystalline diamond monoliths obtained according to the method of the present disclosure are also useful in applications for high-strength, environment-resistant optical components such as high strength optical windows (e.g., pressure-proof windows and ultra-high pressure diamond anvils for research applications).

They may also find use in jewelry craft (large size, i.e., several mm, diamond monoliths may be prepared according to the inventive method), and microelectronics (conductive material).

In another aspect, there is provided the use of a conventional high pressure high temperature (HP-HT) tool belt type apparatus, coupled to a pulsed electric current generator, for preparing highly pure high performance polycrystalline diamond monoliths from diamond powder under a pressure of 3-5 GPa, preferably 4-5 GPa, more preferably 5 GPa, in the absence of any additives such as binder, graphitic material precursor and sintering aid/catalyst aimed at catalysing the formation of intergranular bonds between diamond grains during the sintering step. The combination of the HP-HT tool belt type apparatus and the pulsed electric current generator is referred to as "HP-SPS-Belt equipment": it is an HP-HT tool belt type apparatus activated by pulsed electric current (HP-SPS-Belt). This advantageously leads to a non-friable monolith (flowing powder is obtained when no heating is applied at 5 Pa).

The present invention therefore provides an extremely valuable alternative for the preparation of diamond mono-liths, which overcomes the drawbacks of existing processes.

EQUIVALENTS

The representative examples that follow, together with the appended Figures, are intended to help illustrate the invention, and are not intended to, nor should they be constructed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

EXAMPLES

The process and system (i.e., equipment) according to the present invention and their reduction to practice can be understood further by the examples that illustrate how some of the processes may be carried out. It will be appreciated, however, that these examples should not be construed to limit the invention. Variations of the invention, now known or further developed, are considered to fall within the scope of the present invention as described herein and as hereinafter claimed.

Materials and Methods

The belt apparatus was supplied by Strecon (Denmark). The pressure vessel consists of a cylinder (tungsten carbide die) having a 32 mm inner diameter and 29 mm height cylindrical cavity. In order to perform high temperature and pressure experiment, the Belt apparatus (HP-SPS-Belt) was coupled to an electric pulse current generator supplied by Fuji Electronic Industrial (SCM-3000 model) and is capable to reach 3000 A for 10 V. The operating temperature ranges between 20-1800° C. is provided by direct pulse current provided by Thyristor. Unit pulse has a 3.3 ms duration similar to a conventional SPS from Fuji to be capable to compare conventional and HP for the SPS process. A pulse sequence is defined by a given number of pulse trains followed by periods of zero current. We used a sequence of twelve pulses of total 40 ms followed by two periods of 6.6 ms of zero current. This sequence henceforth is termed 12:2. It should be noticed that such equipment is novel and is built for the first time through our work in the state of art. The electric generator can be controlled manually or automatically via a software control monitor. Experiments were generally run using automatic current control mode.

The high pressure cells contained a graphite furnace (a graphite tube and two graphite studs sandwiching the diamond powder sample inside the tube) with 17 mm internal diameter corresponding to the maximum sample diameter. The sintered sample have 10 mm diameter, with pre-compacted pellet of hexagonal boron nitride (h-BN) ring to obtain comparable sample size with conventional SPS 10 mm diameter die. The external diameter of h-BN ring was 17 mm to match with the graphite furnace. The sample was compressed with two graphite studs inside a graphite tube similar to conventional SPS die assembly. Temperature is adjusted by modification of the % of the filling of the set pulses with elementary 3.3 ms pulses. The powder of diamond particles is pre-compressed inside the h-BN ring before to insert this ring inside the graphite furnace.

Two types of powder diamond were used: Micrometric: Sandvik (MBM 3-6 100: 3-6 μm) and Nanometric: Advanced Abrasives (MDP(N) 100 nm: 70-130 nm). The two were also used as a mixture (the goal was to fill the space between micrometric particles by nanometric particles leading to an increase of densification).

Example 1—from Pure Micrometric Diamond Powder

Pure micrometric diamond particles from Sandvik (MBM 3-6 100: 3-6 μm) were compressed at 5 GPa without heating to form a pre-compacted molded body. The pressure was first increased to the desired value. Then the heating cycle was executed.

Example 2—from a Mixture of Nanometric and Micrometric Diamond Powder

A mixture of micrometric diamond powder (Sandvik, MBM 3-6 100: 3-6 μm) and nanometric diamond powder (Advanced Abrasives, MDP(N) 100 nm: 70-130 nm) was compressed at 5 GPa without heating to form a pre-compacted molded body. The pressure was first increased to the desired value over a period of 30 min. Then the heating cycle was executed using a constant heating rate of 100° C./min to reach the target sintering temperature T. The target sintering temperature was maintained for the desired sintering duration (cf. Table 1), after which time the sample was cooled according to a cooling rate of −100° C./min to reach room temperature (25° C.±3° C.). The pressure was then decreased from 5 GPa to atmospheric pressure over a period of 30 min.

Table 1 compiles the experimental conditions and results. The obtained diamond monoliths were analyzed by XRD and Raman.

| No of exp | % (weight) micrometric powder | % (weight) nanometric powder | Sintering T (° C.) | Sintering duration (min) | Pressure (GPa) |
|---|---|---|---|---|---|
| HP001 | 100 | 0 | 1500 | 1 | 5 |
| HP002 | 100 | 0 | 1600 | 1 | 5 |
| HP003 | 75 | 25 | 1600 | 5 | 5 |
| HP004 | 100 | 0 | 1600 | 5 | 5 |

These results show the possibility to preserve the stability of diamond during the sintering at 5 GPa if the temperature is at least 1500° C. for powder containing only micrometric particles and at least 1600° C. for mixture of micro/nano-metric powder. Even, the duration up to 5 min does not lead to a graphitization.

Figure 3:
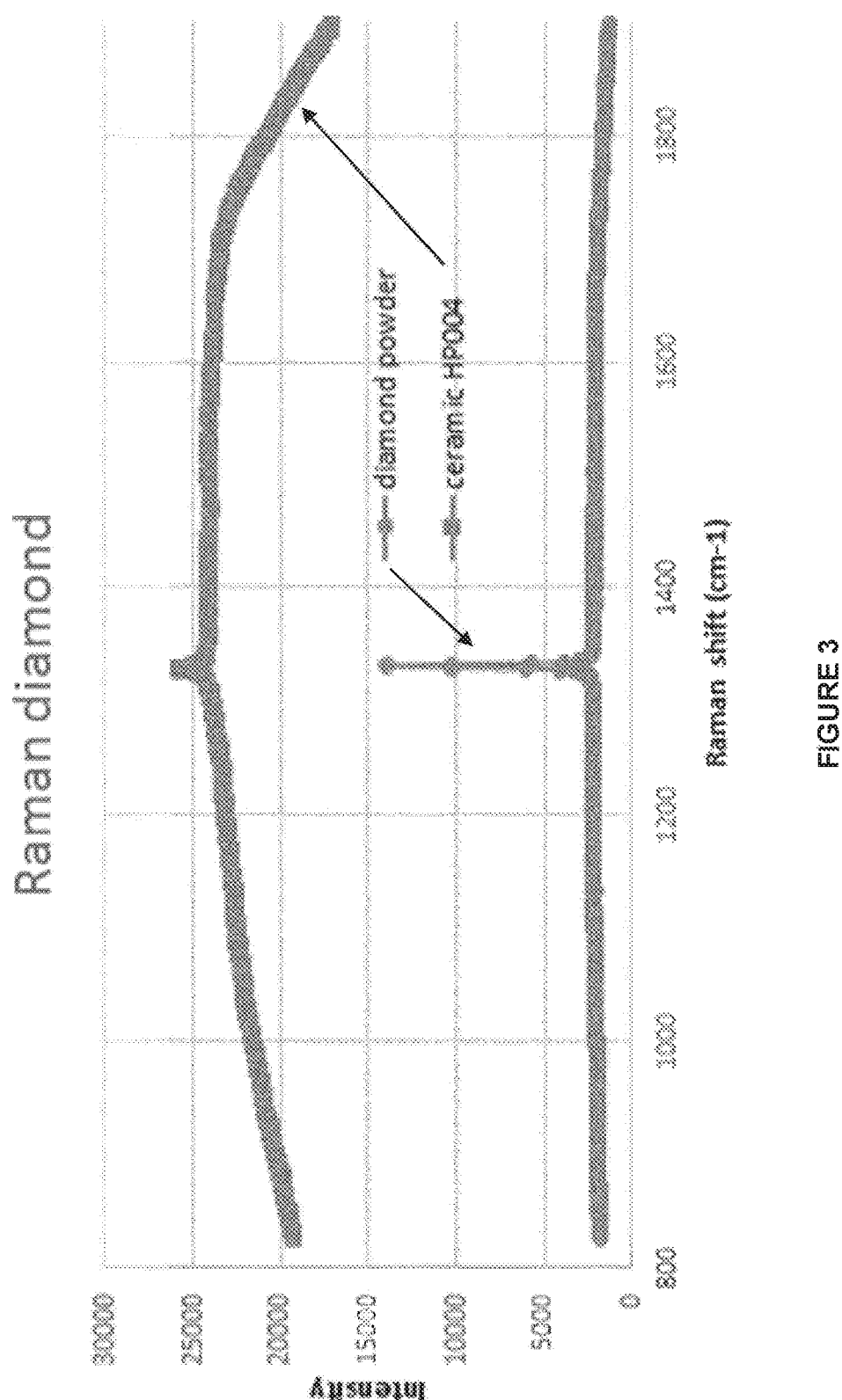
FIG. 3 shows comparative Raman analyses between a diamond monolith obtained according to the present disclosure (Table 1, HP004), as compared to pure diamond.

The XRD diffraction and Raman analyses were performed on diamond monoliths of Table 1. All samples HP001 to HP004 were free of impurities like binder, sintering aids, as measured by XRD diffraction (FIG. 2 for HP001) and free of graphite as measured by Raman spectroscopy. The Raman spectra for HP004 is similar to the reference of pure diamond (diamond powder precursor). FIG. 3

Figure 4:
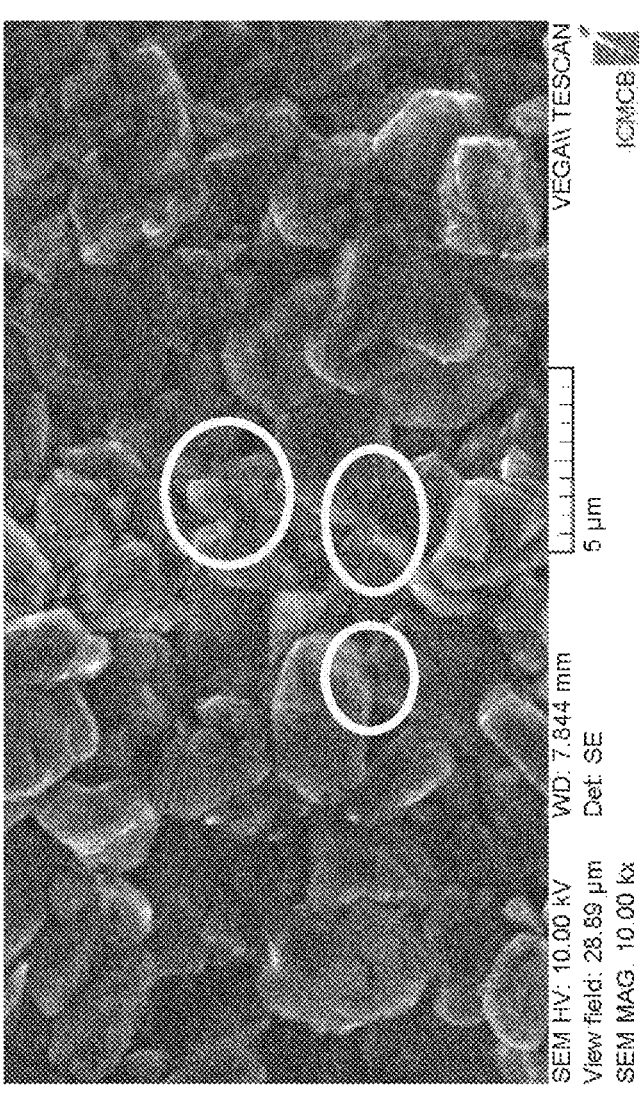
FIG. 4 shows a SEM picture of a pure diamond monolith obtained after sintering micrometric diamond powder according to the method of the present invention (Table 1, HP002).

SEM analysis of HP002 shows the formation of neck between some micrometric particles, which is indicative of the formation of intergranular bonds between diamond grains (FIG. 4).

LIST OF REFERENCES

1. Hitoshi SUMIYA, «Novel Development of High-Pressure Synthetic Diamonds "Ultra-hard Nano-polycrystalline Diamonds"», SEI TECHNICAL REVIEW No 74 (2012).
2. CN103331129A
3. H. Sumiya et al., "Super-hard diamond indenter prepared from high-purity synthetic diamond crystal," Rev. Sci. Instrum., 76, 026112 (2005)

The invention claimed is:

1. A method for preparing a polycrystalline diamond monolith containing more than 98% diamond, the method comprising a sintering step of high pressure spark plasma sintering (HP-SPS) a diamond powder at 1400-1600° C. under a pressure of 3-5 GPa, an electric current flowing through the diamond powder in the absence of any additives, wherein the size of the diamond powder particles ranges from 10 nm to 100 µm.

2. The method according to claim 1, wherein the sintering step is carried out using a HP-HT tool belt apparatus in combination with a pulsed electric current generator.

3. The method according to claim 1, wherein the spark plasma sintering effect is effected by the application of a pulsed electric current.

4. The method according to claim 3, wherein the pulsed electric current is generated with a pulse duration of 3.3 ms generated by an electric pulse generator capable to deliver 3000 A/10V.

5. The method according to claim 3, wherein the pulse sequence (on:off) is 12:2 and is delivered from a direct pulse current.

6. The method according to claim 1, wherein the diamond powder is raw diamond powder material obtained by static high pressure method, mechanical crushing large diamond particles, chemical vapor deposition, or from natural minerals, residues from the mining of diamond mines or the cutting of diamonds.

7. The method according to claim 6, wherein the raw diamond powder:

is a nanometric diamond powder with a particle size ranging from 10-900 nm;

is a micrometric diamond powder with a particle size ranging from 1-100 µm; or is a heterogenous mixture of nanometric and micrometric diamond powder with a particle size ranging from 10 nm to 100 µm;

the diamond particle size being measured by dynamic light scattering (DLS).

8. The method according to claim 6, wherein the raw diamond powder is placed inside a HP-SPS-Belt electrically conducting cell, and is sintered for 5 seconds to 30 minutes, at 1400-1600° C. under a pressure of 4-5 GPa.

9. The method according to claim 8, wherein the raw diamond powder is shaped into a body without binder prior to being placed inside the HP-SPS-Belt electrically conducting cell, or prior to being sintered in the HP-SPS-Belt electrically conducting cell.

10. The method according to claim 1, wherein the resulting polycrystalline diamond monolith:

is chemically pure as measured by XRD, is free of graphite phase as measured by Raman spectroscopy, and presents only diamond phase as measured by Raman spectroscopy.

11. The method according to claim 1, wherein the resulting polycrystalline diamond monolith exhibits sufficient mechanical strength for handling the polycrystalline diamond monolith without disaggregation.

12. The method according to claim 1, wherein the resulting polycrystalline diamond monolith is transparent in the infrared region such that it allows the transmission of ≥85% of incident light at wavelengths 700 nm-0.1 mm.

13. The method according to claim 1, wherein said sintering step is carried out under a pressure of 4-5 GPa.

* * * * *